United States Patent
Boulanger et al.

(10) Patent No.: US 10,671,170 B2
(45) Date of Patent: Jun. 2, 2020

(54) HAPTIC DRIVING GUIDANCE SYSTEM

(71) Applicant: HARMAN INTERNATIONAL INDUSTRIES, INCORPORATED, Stamford, CT (US)

(72) Inventors: Adam Boulanger, Palo Alto, CA (US); Joseph Verbeke, Mountain View, CA (US); Stefan Marti, Oakland, CA (US); Davide Di Censo, Sunnyvale, CA (US)

(73) Assignee: Harman International Industries, Inc., Stamford, CT (US)

( * ) Notice: Subject to any disclaimer, the term of this patent is extended or adjusted under 35 U.S.C. 154(b) by 0 days.

(21) Appl. No.: 16/319,316

(22) PCT Filed: Jun. 15, 2017

(86) PCT No.: PCT/US2017/037619
§ 371 (c)(1),
(2) Date: Jan. 18, 2019

(87) PCT Pub. No.: WO2018/017212
PCT Pub. Date: Jan. 25, 2018

(65) Prior Publication Data
US 2019/0283780 A1 Sep. 19, 2019

Related U.S. Application Data

(60) Provisional application No. 62/365,960, filed on Jul. 22, 2016.

(51) Int. Cl.
*G06F 3/01* (2006.01)
*H04R 1/46* (2006.01)
(Continued)

(52) U.S. Cl.
CPC .............. *G06F 3/016* (2013.01); *B60K 37/06* (2013.01); *B60Q 9/00* (2013.01); *B60W 50/16* (2013.01);
(Continued)

(58) Field of Classification Search
CPC ................................ B60W 50/16; B60Q 9/00
(Continued)

(56) References Cited

U.S. PATENT DOCUMENTS 6,338,028 B1 1/2002 Shelton et al.
7,560,826 B2 7/2009 Hijikata et al.
(Continued)

OTHER PUBLICATIONS

International Search Report for Application No: PCT/US2017/037619, dated Sep. 27, 2017, 7 pages.
(Continued)

*Primary Examiner* — Eric Blount
(74) *Attorney, Agent, or Firm* — Artegis Law Group, LLP

(57) ABSTRACT

A system for directing a user to modify an aspect of a vehicle via haptic output. The system includes one or more haptic output devices disposed proximate to a vehicle device and configured to generate haptic output in response to a control signal. The system further includes a processor coupled to the one or more haptic output devices. The processor is configured to determine that a parameter associated with the vehicle device should be modified, and, in response to the determining, transmit the control signal to the one or more haptic output devices.

18 Claims, 5 Drawing Sheets

(51) Int. Cl.
| | | |
|---|---|---|
| *B60Q 9/00* | (2006.01) | |
| *B60W 50/16* | (2020.01) | |
| *G06F 9/30* | (2018.01) | |
| *B60K 37/06* | (2006.01) | |
| *G06F 3/041* | (2006.01) | |
| *G06F 3/0488* | (2013.01) | |

(52) U.S. Cl.
CPC ........ *G06F 3/0414* (2013.01); *G06F 3/0488* (2013.01); *G06F 9/3004* (2013.01); *H04R 1/46* (2013.01); *B60W 2550/20* (2013.01); *B60W 2552/00* (2020.02); *B60W 2554/00* (2020.02); *G06F 2203/014* (2013.01); *H04R 2460/13* (2013.01)

(58) Field of Classification Search
USPC ....................................................... 340/438
See application file for complete search history.

(56) References Cited

U.S. PATENT DOCUMENTS

| | | | |
|---|---|---|---|
| 8,547,215 B2 | 10/2013 | Sanma et al. | |
| 8,845,110 B1 | 9/2014 | Worley, III | |
| 8,970,358 B2 | 3/2015 | Kiefer et al. | |
| 9,002,020 B1 | 4/2015 | Kim et al. | |
| 9,081,651 B2 | 7/2015 | Filev et al. | |
| 9,290,174 B1 | 3/2016 | Zagorski | |
| 9,317,119 B2 | 4/2016 | Hirose et al. | |
| 9,656,606 B1 | 5/2017 | Vose et al. | |
| 9,718,400 B2 | 8/2017 | Knobl et al. | |
| 9,827,811 B1 | 11/2017 | Mcnew et al. | |
| 9,827,904 B2 * | 11/2017 | Modarres ............... | B60Q 9/008 |
| 10,191,537 B2 | 1/2019 | Tanaka et al. | |
| 10,235,848 B2 | 3/2019 | Billington et al. | |
| 10,275,029 B2 | 4/2019 | Jones et al. | |
| 10,282,981 B1 | 5/2019 | Nepomuceno et al. | |
| 10,479,271 B2 | 11/2019 | Hashimoto et al. | |
| 2003/0168838 A1 | 9/2003 | Breed et al. | |
| 2004/0049323 A1 | 3/2004 | Tijerina et al. | |
| 2006/0284839 A1 | 12/2006 | Breed et al. | |
| 2007/0236450 A1 | 10/2007 | Colgate et al. | |
| 2009/0073112 A1 | 3/2009 | Basson et al. | |
| 2009/0076723 A1 | 3/2009 | Moloney | |
| 2009/0259372 A1 | 10/2009 | Hijikata et al. | |
| 2009/0284485 A1 | 11/2009 | Colgate et al. | |
| 2010/0013613 A1 | 1/2010 | Weston | |
| 2010/0085168 A1 | 4/2010 | Kyung et al. | |
| 2010/0198458 A1 | 8/2010 | Buttolo et al. | |
| 2011/0310028 A1 | 12/2011 | Camp, Jr. et al. | |
| 2012/0126965 A1 * | 5/2012 | Sanma ................... | B62D 1/046 340/438 |
| 2012/0306631 A1 | 12/2012 | Hughes | |
| 2013/0127755 A1 | 5/2013 | Lynn et al. | |
| 2013/0155020 A1 | 6/2013 | Heubel et al. | |
| 2013/0222311 A1 | 8/2013 | Pesonen | |
| 2014/0309880 A1 | 10/2014 | Ricci | |
| 2014/0310594 A1 | 10/2014 | Ricci et al. | |
| 2014/0320402 A1 | 10/2014 | Stahlberg | |
| 2014/0346823 A1 | 11/2014 | Stebbins et al. | |
| 2014/0363033 A1 | 12/2014 | Heiman et al. | |
| 2015/0070148 A1 | 3/2015 | Cruz-Hernandez et al. | |
| 2015/0097657 A1 | 4/2015 | Gandhi et al. | |
| 2015/0175172 A1 * | 6/2015 | Truong ................ | B60W 50/10 701/36 |
| 2015/0197283 A1 | 7/2015 | Marti et al. | |
| 2015/0199950 A1 | 7/2015 | Heiman et al. | |
| 2015/0268722 A1 | 9/2015 | Wang et al. | |
| 2015/0268726 A1 | 9/2015 | Saboune et al. | |
| 2015/0293592 A1 | 10/2015 | Cheong | |
| 2016/0004309 A1 | 1/2016 | Modarres et al. | |
| 2016/0107570 A1 | 4/2016 | Modarres et al. | |
| 2016/0187979 A1 | 6/2016 | Nahman et al. | |
| 2016/0207454 A1 | 7/2016 | Cuddihy et al. | |
| 2016/0217778 A1 | 7/2016 | Iermenko | |
| 2017/0021762 A1 | 1/2017 | Daman | |
| 2017/0169673 A1 | 6/2017 | Billington et al. | |
| 2019/0047591 A1 | 2/2019 | Augst | |

OTHER PUBLICATIONS

Extended European Search Report for application No. 17831480.3 dated Nov. 21, 2019, 7 pages.
Extended European Search Report for application No. 17831478.7 dated Nov. 21, 2019, 7 pages.
International Search Report for application No. PCT/US2017/037593 dated Sep. 7, 2017, 7 pages.
Non-Final Rejection received for U.S. Appl. No. 16/319,331, dated Jan. 10, 2020, 24 pages.
Extended European Search Report for application No. 17831936.4 dated Nov. 22, 2019, 7 pages.
International Search Report for application No. PCT/US2017/043238 dated Oct. 2, 2017, 7 pages.
Non-Final Rejection received for U.S. Appl. No. 16/319,319, dated Dec. 27, 2019, 26 pages.
Extended European Search Report for application No. 17831937.2 dated Nov. 26, 2019, 8 pages.
International Search Report for application No. PCT/US2017/043240 dated Sep. 29, 2017, 9 pages.
Extended European Search Report for application No. 178319893 dated Nov. 29, 2019, 8 pages.
International Search Report for application No. PCT/US2017/043374 dated Oct. 6, 2017, 14 pages.
Non-Final Rejection received for U.S. Appl. No. 16/319,332, dated Nov. 27, 2019, 28 pages.
Extended European Search Report for application No. 17831938.0 dated Dec. 6, 2019, 7 pages.
International Search Report for application No. PCT/US2017/043242 dated Sep. 29, 2017, 9 pages.
Non-Final Office Action for U.S. Appl. No. 16/319,331 dated Jan. 10, 2020, 18 pages.
Non-Final Rejection received for U.S. Appl. No. 16/319,330, dated Mar. 4, 2020, 50 pages.

* cited by examiner ic DRIVING GUIDANCE SYSTEM

CROSS-REFERENCE TO RELATED APPLICATIONS

The present application is a national stage application of the international application titled, "HAPTIC DRIVING GUIDANCE SYSTEM," filed on Jun. 15, 2017 and having application number PCT/US2017/037619, which claims the priority benefit of the U.S. Provisional Patent Application titled, "VEHICLE INTERFACE SYSTEMS," filed on Jul. 22, 2016 and having Ser. No. 62/365,960. The subject matter of these related applications is hereby incorporated herein by reference.

BACKGROUND

Field of the Embodiments

The various embodiments relate generally to human-machine interfaces and, more specifically, to a haptic driving guidance system.

Description of the Related Art

Modern vehicles, such as automobiles, motorbikes, boats, and airplanes, increasingly rely on control units to monitor and optimize the performance of vehicle subsystems. For example, a control unit could determine that a particular subsystem is performing suboptimally and then determine one or more parameters that could be adjusted in order to improve the operation of the subsystem. Some parameters, on the other hand, can be adjusted directly by the driver. For example, a driver may operate one or more vehicle devices, such as a transmission clutch and a gearshift, in order to disengage a vehicle drive shaft and then adjust a transmission gear ratio.

Conventionally, when a driver is operating a particular vehicle subsystem in a suboptimal manner, a control unit may activate a visual and/or auditory notification to indicate to the driver that one or more parameters associated with the subsystem should be adjusted. For example, when a vehicle transmission is in a suboptimal gear, an up-arrow may be displayed on a car dashboard display, indicating that the driver should shift to a higher gear, or a down-arrow may be displayed, indicating that the driver should shift to a lower gear. In addition, conventional systems may generate an alert tone to indicate that the driver should shift gears.

These types of conventional approaches may require the driver to direct his or her attention towards interpreting visual and/or auditory notification(s). For example, visual and/or auditory notifications may not clearly indicate to the driver which action(s) should be taken in a given situation. As a result, a driver may be required to expend additional cognitive resources in order to interpret the visual and auditory notifications.

As the foregoing illustrates, techniques for more effectively providing driving guidance to a user would be useful.

SUMMARY

Embodiments of the present disclosure set forth a method for directing a user to modify an aspect of a vehicle via haptic output. The method includes determining that a parameter associated with a vehicle device should be modified. The method further includes, in response to the determining, transmitting one or more controls signals to one or more haptic output devices that are proximate to the vehicle device, where the one or more haptic output devices generate haptic output based on the one or more control signals.

Further embodiments provide, among other things, a system and a non-transitory computer-readable storage medium configured to implement the techniques set forth above.

At least one advantage of the techniques described herein is that a user can be notified that a parameter should be modified without requiring the user to divert his or her attention to a visual and/or auditory notification. Accordingly, a user is able to determine the parameter(s) which should be modified without the user having to expend additional cognitive resources to analyze a visual and/or auditory notification. Further, haptic sensations can be implemented as an alternative means for communicating various types of information to the user without overwhelming the user's visual and auditory senses. As a result, the techniques described herein may reduce the cognitive workload placed on a user when various types of information are provided to the user.

BRIEF DESCRIPTION OF THE SEVERAL VIEWS OF THE DRAWINGS

So that the manner in which the recited features of the one or more embodiments set forth above can be understood in detail, a more particular description of the one or more embodiments, briefly summarized above, may be had by reference to certain specific embodiments, some of which are illustrated in the appended drawings. It is to be noted, however, that the appended drawings illustrate only typical embodiments and are therefore not to be considered limiting of its scope in any manner, for the scope of the various embodiments subsumes other embodiments as well.

DETAILED DESCRIPTION

Figure 1:
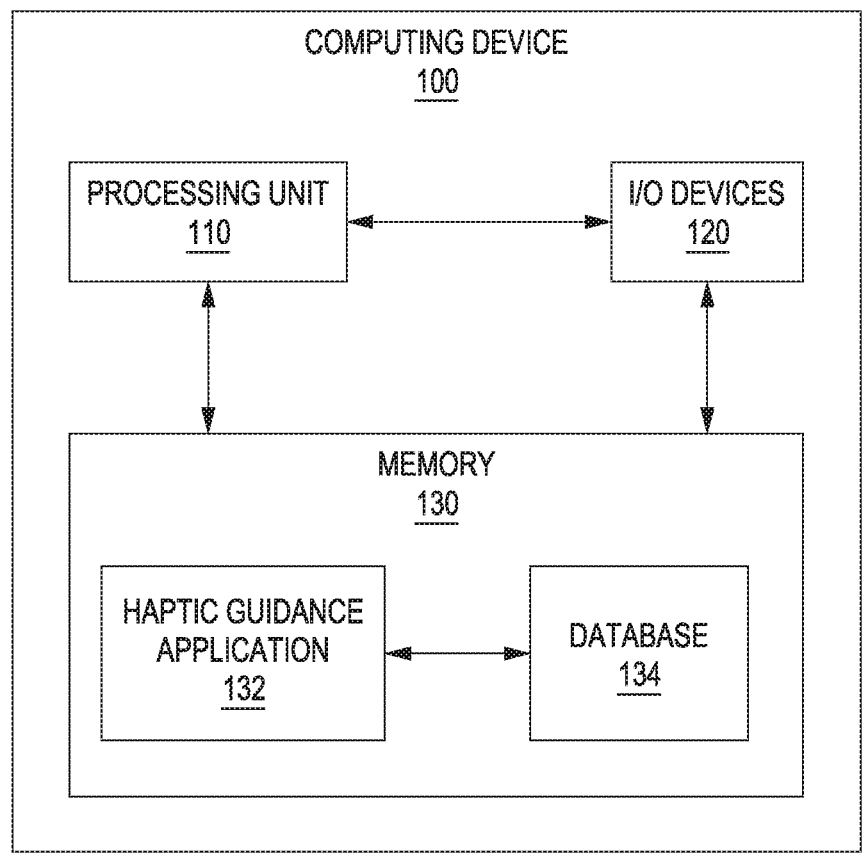
FIG. 1 illustrates a conceptual block diagram of a computing device configured to implement one or more aspects of the present invention, according to various embodiments.

FIG. 1 illustrates a conceptual block diagram of computing device 100 configured to implement one or more aspects of the present invention, according to various embodiments. As shown, computing device 100 includes, without limitation, processing unit 110, input/output (I/O) devices 120, and memory device 130. Memory device 130 includes a haptic guidance application 132 configured to interact with database 134.

Processing unit 110 may include a central processing unit (CPU), digital signal processing unit (DSP), a sensor processing unit, a controller unit, and so forth. In various embodiments, processing unit 110 is configured to analyze sensor data acquired via one or more sensors to determine a position and/or orientation of one or more parts of a user (e.g., a user's hand, finger, wrist, arm, foot, ankle, leg, trunk, etc.) and/or determine a position and/or orientation of a vehicle device. In some embodiments, processing unit 110 is further configured to determine the position and/or orientation of the vehicle device relative to a position and/or orientation of the user. For example, and without limitation, processing unit 110 could execute haptic guidance application 132 to analyze sensor data and/or data from one or more control units in order to determine that a hand and/or a vehicle device are in a particular position and/or orientation. In addition, processing unit 110 may continually process sensor data and data from one or more control units as the position and/or orientation of the hand and/or the vehicle device change.

I/O devices 120 may include input devices, output devices, and devices capable of both receiving input and providing output. For example, and without limitation, I/O devices 120 may include external cameras, driver facing cameras, global navigation satellite systems (GNSS) speedometer, tachometer, telemetry sensors, external network connections, gyroscopes, barometers, fuel-level sensors, tire pressure sensors, etc. I/O devices 120 may also include one or more haptic output devices, such as ultrasound transducers, air vortex generators, pneumatic devices, air bladders, etc. In addition, I/O devices 120 may include surface changing devices, such as a device that uses microfluidics, ferrofluidics, electrostatic, and/or electrodynamic methods to change the characteristics of a vehicle surface. Moreover, I/O devices may also include wearable haptic transducers on a forearm, leg, finger, etc. I/O devices could include one or more wired or wireless communication devices that receive sensor data including a position and/or orientation of a vehicle device, a position and/or orientation of a user, in addition to interaction events between the vehicle device and the user (e.g., via a controller area network, a local interconnect network, a FlexRay®, etc.).

Memory unit 130 may include a memory module or collection of memory modules. Memory unit 130 includes haptic guidance application 132 and database 134. Haptic guidance application 132 may receive data from I/O devices 120 and/or access database 134. Database 134 may store digital signal processing algorithms, object recognition data, and user preferences data. Processing unit 110 executes haptic guidance application 132, thereby implementing some or all functions of computing device 100.

Computing device 100 as a whole may be a microprocessor, an application-specific integrated circuit (ASIC), a system-on-a-chip (SoC) and so forth. Generally, computing device 100 may be configured to coordinate the overall operation of a haptic output device, such as an ultrasonic transducer array, an air vortex generator, etc. In other embodiments, computing device 100 may be coupled to, but separate from one or more haptic output devices. In such embodiments, the haptic output devices may include a dedicated processor that receives data (e.g., a position and/or orientation of a hand and a vehicle device) from computing device 100 and transmits data (e.g., haptic output event data) to computing device 100. In some embodiments, the dedicated processor may be included in a driver assistance system or may be physically brought into an environment by the user as a mobile or wearable device. The mobile or wearable device may be physically or wirelessly connected to computing device 100. For example, the dedicated processor could be included in a consumer electronic device, such as a smartphone, personal computer, wearable device and the like. However, the embodiments disclosed herein contemplate any technically feasible system configured to implement the functionality of the haptic output devices.

As noted above, conventional approaches may require the driver to direct his or her attention towards interpreting visual and/or auditory notification(s). For example, visual and/or auditory notifications may not clearly indicate to the driver which action(s) should be taken in a given situation. As a result, a driver may be required to expend additional cognitive resources in order to interpret the visual and auditory notifications.

Various embodiments described herein provide techniques for driver guidance beyond the conventional approaches by generating one or more haptic sensations that indicate one or more actions that should be performed by a user (e.g., a driver) in order to modify one or more vehicle parameters. For example, the driver could modify one or more parameters by changing a position and/or state of one or more vehicle devices. In general, the vehicle may include any type of transportation device, including, without limitation, a car, a truck, a motorbike, a boat, a submarine, a personal watercraft, a snow mobile, an airplane, a space craft, and so forth. The driver could be located inside the vehicle or outside of the vehicle, such as in a remote drone control station. In operation, haptic guidance application 132 receives a notification of the parameter(s) which should be modified. In some embodiments, haptic guidance application 132 could then determine the location of the user (e.g., the user's hand, arm, foot, ankle, finger, finger tip, and so forth), such as the location of the user relative to a vehicle device that corresponds to the parameter(s). Next, haptic guidance application 132 may determine a type of haptic sensation to generate on the user. For example, haptic guidance application 132 could determine the frequency, intensity, location, size, movement, pattern, direction, shape, etc. of a haptic sensation to be generated on the user. Finally, haptic guidance application 132 generates the haptic sensation on the user via one or more haptic output devices in order to direct the user to modify the vehicle parameter(s). In particular, haptic output devices that generate haptic sensations on a user without making direct, physical contact with the user can be implemented in any embodiment disclosed herein. Examples of such techniques are described below in further detail in conjunction with FIGS. 2, 3, 4A-4C, and 5.

Figure 2:
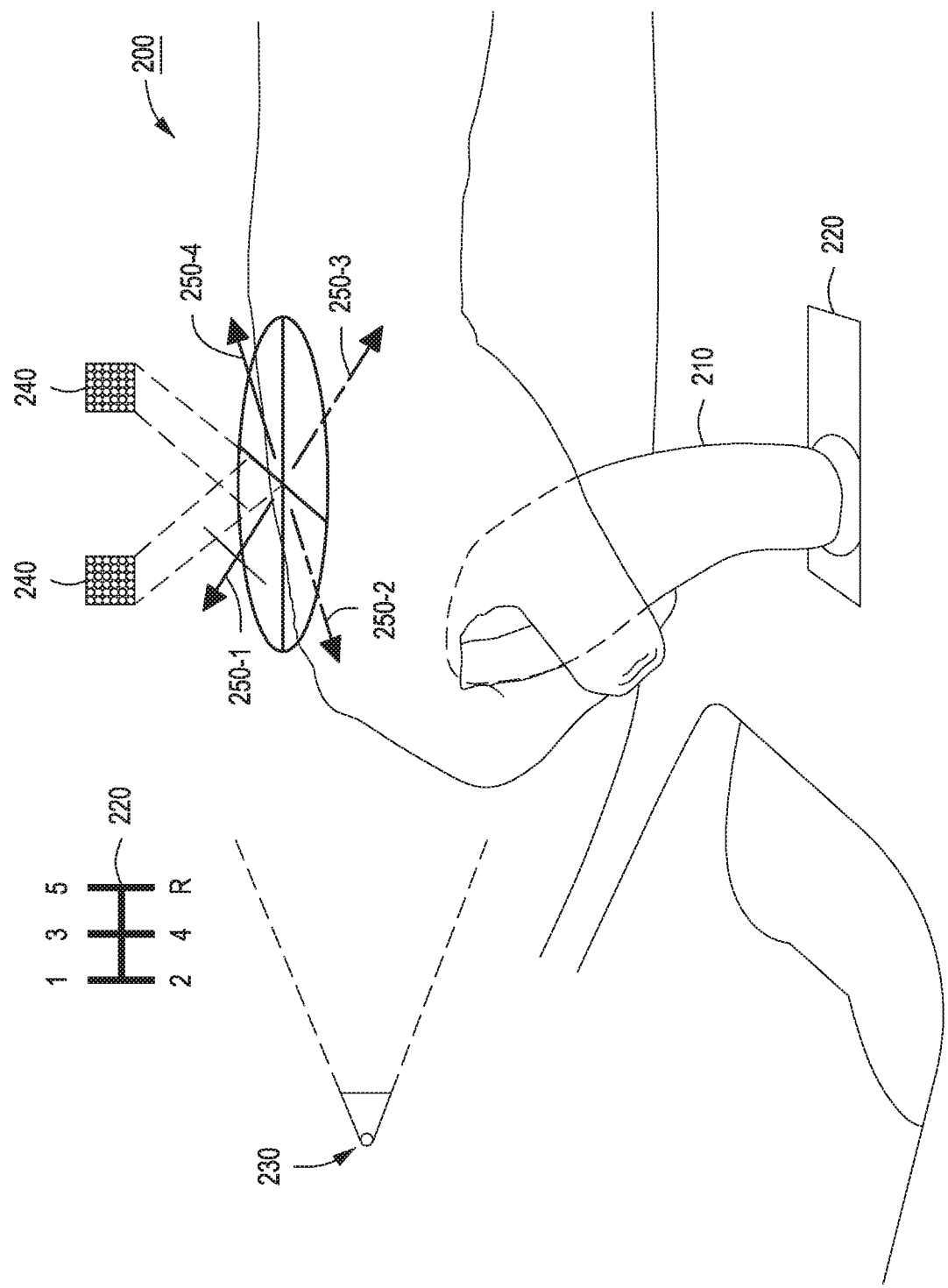
FIG. 2 illustrates a technique for directing a driver to shift the position of a vehicle gearshift via haptic sensations, according to various embodiments.

FIG. 2 illustrates a technique for directing a driver to shift the position of a vehicle gearshift via haptic sensations, according to various embodiments. As shown, system environment 200 includes gearshift knob 210, gearshift plate 220, sensors 230, and haptic output devices 240. In general, haptic output devices 240 may include any type of device, such as an ultrasonic transducer array and/or an air output device, that is capable of generating a haptic sensation on a user.

As noted above, in various embodiments, haptic sensations may be generated in order to direct a driver to operate a vehicle device (e.g., gearshift knob 210) to modify one or more parameters of the vehicle. In some embodiments, haptic guidance application 132 receives control signals from one or more control units included in the vehicle via one or more communications pathways (e.g., a vehicle bus, a controller area network, a local interconnect network, a wireless communications protocol, etc.). For example, a control unit could transmit one or more signals to haptic guidance application 132 in order to indicate that a vehicle parameter should be modified by a user. Haptic guidance application 132 then generates haptic output 250 to indicate to the user that the vehicle parameter should be modified and/or how the vehicle parameter should be modified.

For example, as shown in FIG. 2, haptic sensations could be generated on a hand of a driver via haptic output devices 240 to direct the driver to upshift or downshift a vehicle transmission via the gearshift knob 210. In some embodiments, an engine control unit could first notify haptic guidance application 132 via a vehicle bus that the transmission should be upshifted or downshifted. Haptic guidance application 132 could then generate haptic output 250 via the haptic output devices 240 to indicate to the driver that the position of the gearshift knob 210 should be changed in order to modify the transmission and/or how the position of the gearshift knob 210 should be changed (e.g., by moving the gearshift knob 210 into a slot of gearshift plate 220 that is associated with a higher or lower transmission gear).

In some embodiments, the haptic output 250 generated by the haptic output device(s) 240 indicates a specific direction that the user should move the vehicle device in order to modify a corresponding parameter. For example, as shown in FIG. 2, haptic output 250 could be generated in a specific direction across the hand of a driver, where the direction indicates the gear to which the driver should move the gearshift knob 210. In a more specific example, if the gearshift knob 210 was in fifth gear, and haptic guidance application 132 received a control signal indicating that the transmission should be downshifted, then haptic output 250-3 could be generated to instruct the driver to shift to fourth gear. In another example, if the gearshift knob 210 was in second gear and haptic guidance application 132 received a control signal indicating that the transmission should be upshifted, then haptic output 250-1 could be generated to instruct to the driver to shift to third gear. Similar directional techniques may be implemented by haptic guidance application 132 for any type of vehicle device that enables a parameter to be modified by pushing, pulling, sliding, or otherwise repositioning the vehicle device in a specific direction.

In one embodiment, the specific direction that the haptic guidance application 132 indicates via haptic output is an absolute direction. In particular, the absolute direction may be the direction in which the hand should move in order to move the vehicle device to the new position. For example, haptic output 250-1 could indicate the direction that the driver should move his hand in order to move the gearshift knob 210 from the second gear slot to the third gear slot. Even when the orientation of the user's hand changes with respect to the gearshift knob 210, the haptic guidance application 132 does not vary the direction of haptic output 250-1. Additionally or alternatively, haptic guidance application 132 may indicate a relative direction on the user's hand. When generating a relative direction, haptic guidance application 132 varies the direction of haptic output 250-1 with respect to the present orientation of the user's hand. Thus, haptic guidance application 132 configures the haptic output devices to generate haptic output that moves between two parts of the user's hand, regardless of how the hand is oriented with respect to the vehicle device. For example, regardless of how the user's hand is oriented with respect to the gearshift knob 210, the haptic guidance application 132 could generate haptic output 250-1 that moves between the center of the user's hand and the knuckle of the pinky finger. Such a haptic sensation would consistently indicate that the user should shift the gearshift knob 210 from the second gear slot to the third gear slot.

In some embodiments, haptic guidance application 132 may generate haptic sensations that are perceived by a user as having a specific shape (e.g., a ridge). In addition, haptic guidance application 132 may determine an initial position and a path along which the haptic sensation should move on the user's hand. Specifically, the haptic sensation may first be generated at an initial position on the hand of the user and then moved along a path in one or more directions on the user's hand. For example, haptic guidance application 132 could generate a haptic sensation in the form of a ridge which starts at the wrist of the left hand and moves to the knuckles of the left hand. Haptic guidance application 132 could further generate another haptic sensation in the form of a ridge which starts at the knuckles of the right hand and moves to the wrist of the right hand. In some embodiments, haptic guidance application 132 may receive the current value of one or more parameter(s) and the target value of the parameter(s). Haptic guidance application 132 may then determine which vehicle device(s) are associated with the parameter(s) and the manner in which the vehicle device(s) should be modified in order to change the value of the parameter(s) from the current value to the target value. Additionally or alternatively, upon receiving an indication that a vehicle parameter should be modified, haptic guidance application 132 could select from a set of predetermined transitions (e.g., stored in database 134) that are associated with the vehicle device. For example, an engine control unit could indicate the current gear in which a transmission is operating and that the gear should be increased. Haptic guidance application 132 could then determine, based on a predetermined transition associated with shifting from second gear to third gear, that haptic output 250-1 should be generated on the user to direct the user to move gearshift knob 210 upwards and to the right. Haptic guidance application 132 could then cause haptic output devices 240 to generate haptic output 250-1 on the user.

In some embodiments, haptic guidance application 132 may associate specific parameters with specific vehicle devices and/or haptic output devices 240 (e.g., via a look-up table stored in database 134). Then, upon receiving, from a control unit, a control signal that specifies a particular parameter, haptic guidance application 132 may determine a vehicle device that is associated with the parameter and/or one or more haptic output devices 240 that should be implemented to generate the haptic sensations. Haptic guidance application 132 then causes those haptic output device(s) 240 to generate a haptic sensation on the user.

In some embodiments, a control unit may indicate to haptic guidance application 132 the vehicle device(s) that are associated with one or more parameters that should be modified as well as the manner in which those vehicle device(s) should be modified. For example, a control unit could indicate to haptic guidance application 132 that a clutch pedal should be depressed and/or how far the clutch pedal should be depressed before the position of gearshift knob 210 is modified. Haptic guidance application 132 could then generate haptic output 250 via one or more haptic output devices 240 proximate to the clutch pedal to direct the driver to depress the clutch pedal by the distance specified by the control unit. For example, haptic output 250 could be generated on a leg or foot of the user until the clutch pedal reaches the position specified by the control unit. Haptic guidance application 132 could implement similar techniques with respect to a vehicle accelerator pedal and/or a vehicle brake pedal.

In various embodiments, one or more sensors 230 may be implemented to acquire sensor data that is then processed by haptic guidance application 132 to determine the location and/or orientation of the user and/or a vehicle device. For example, haptic guidance application 132 could analyze sensor data acquired by the sensor(s) 230 to determine whether a hand of the driver is located proximate to one or more vehicle devices (e.g., gearshift knob 210). Haptic guidance application 132 could then cause one or more haptic output devices 240 to generate haptic output 250 based on the specific location of the hand of the user. In some embodiments, by determining the specific location of the user and/or a vehicle device being operated by a user, haptic output 250 may be more precisely generated in order to direct the user to modify the vehicle device in a specific manner. For example, with reference to FIG. 2, different users may position their hand in different locations on gearshift knob 210. As a result, detecting the location of the hand of the user via one or more sensors 230 may enable haptic output 250 to be generated more precisely on a specific portion of the hand.

Further, guidance application 132 could analyze sensor data in order to determine the location of the user (e.g., a location of a hand, arm, foot, leg, etc.) in order to select one or more haptic output devices 240 that are proximate to that location. Haptic output 250 could then be generated on the user via the selected haptic output devices 240. For example, haptic guidance application 132 could determine the location and orientation of the driver's hand with respect to gearshift knob 210 by analyzing sensor data received from sensors 230. Haptic guidance application 132 could then select one or more haptic output devices 240 that are best positioned to generate haptic sensations on the hand.

In some embodiments, haptic guidance application 132 may further determine a frequency, shape, orientation, position, and/or intensity of the haptic sensation. For example, haptic guidance application 132 could vary the frequency and intensity of the haptic sensation in order to convey to the driver the urgency of shifting the transmission to a different gear.

Haptic output devices 240 may be located at various positions around the vehicle, such as above gearshift knob 210, on the vehicle dashboard, below the driver's hand, etc. For example, in system environment 200, haptic output devices 240 are located above gearshift knob 210. Additionally, haptic output devices 240 can be opportunistically placed in unused areas of the vehicle (e.g., unused space on the vehicle dashboard) that provide an appropriate output trajectory relative to the vehicle device(s) and/or the driver. In addition, haptic output devices 240 can be proximate to a vehicle device (e.g., within a vehicle device, along a perimeter of the vehicle device) and/or proximate to the user.

Figure 3:
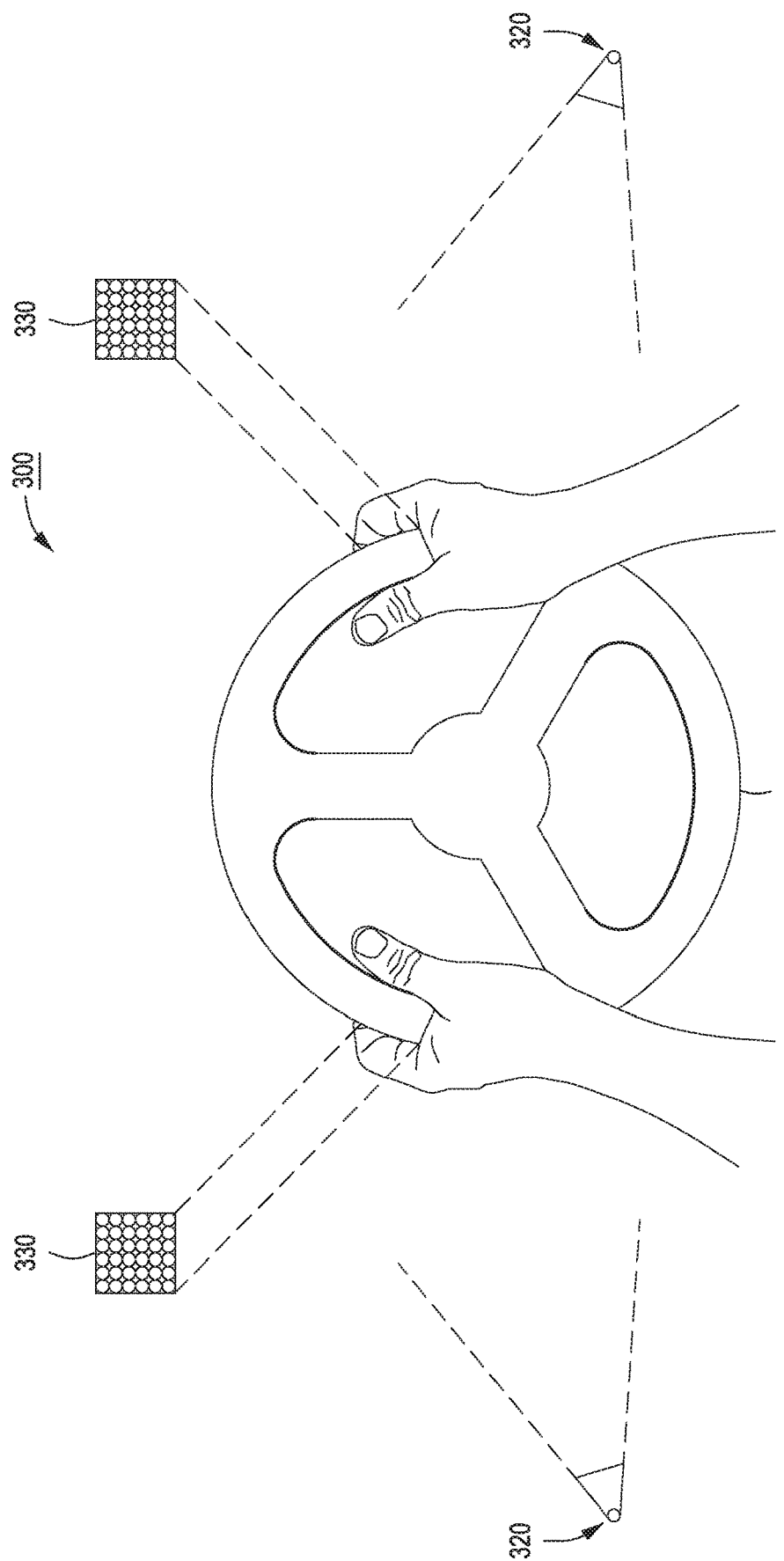
FIG. 3 illustrates a technique for guiding steering behavior via haptic sensations, according to various embodiments.

FIG. 3 illustrates a technique for guiding steering behavior via haptic sensations, according to various embodiments. As shown, system environment 300 includes steering wheel 310, sensors 320, and haptic output devices 330.

In various embodiments, haptic guidance application 132 may direct a driver to modify his or her steering behavior via haptic sensations. For example, haptic guidance application 132 could receive one or more control signals from a control unit, where the control signals indicate that the car should be steered in a particular direction. One or more haptic output devices 330 may then be implemented to generate haptic sensations on a user's hands to direct the user to move the steering wheel in a particular manner. For example, haptic sensations could be generated on the left hand of the user to direct the user to steer to the left, or haptic sensations could be generated on the right hand of the user to direct the user to steer to the right. Additionally, in some embodiments, haptic sensations could be generated in a specific direction across the hand and/or arm of the user to indicate that the steering wheel should be turned to the left or right. For example, haptic sensations could be generated in a clockwise direction across the user to indicate that the wheel should be turned to the right, or haptic sensations could be generated in a counterclockwise direction across the user to indicate that the wheel should be turned to the left. Similar techniques may be implemented by haptic guidance application 132 for any type of vehicle device that enables a parameter to be modified by turning or rotating the vehicle device.

Haptic guidance application 132 may further determine the location of the user relative to the vehicle device via sensors 320. In some embodiments, haptic guidance application 132 may analyze the sensor data from sensors 320 to determine the direction that haptic output devices 330 should output haptic output in order to generate a haptic sensation on the user's hands. Then, haptic guidance application 132 may further determine one or more characteristics of the haptic sensation to generate on the user and may output control signals to haptic output devices 330 that generate the haptic sensation on the user.

For example, if the vehicle is drifting out of a lane and/or is moving towards the edge of the road, haptic guidance application 132 could determine the orientation of the steering wheel and optionally determine the location and orientation of the driver's hands via one or more of sensors 320. Haptic guidance application 132 could then determine one or more characteristics of the haptic sensation to generate on the driver's hand in order to indicate to the driver that he or she should steer the vehicle back into the lane and/or away from the edge of the road. In some embodiments, one or more haptic sensations that are perceived by the driver as ridges, described above, could be generated on the hand(s) of a driver to indicate that he or she should turn the steering wheel to the right or left. Additionally, the frequency and/or intensity of a haptic sensation may be increased as the driver drifts further towards a dangerous condition, such as when a vehicle drifts further towards the edge of a road, across a lane line, and/or towards another vehicle or object.

In some embodiments, haptic guidance application 132 may guide the driver through some or all actions that the driver should take to drive a vehicle from one location to another location. For example, haptic guidance application 132 could generate sequences of haptic sensations in order to guide a driver in steering between his house and his place of work. Haptic guidance application 132 could further generate sequences of haptic sensations via one or more haptic output devices 240 to guide the driver's shifting behavior, acceleration, braking, and so forth in order to facilitate the driver in safely traveling to a given destination.

For example, haptic output devices 330 could be located on a vehicle steering column and/or in a vehicle foot well. When haptic guidance application 132 receives control signals indicating that the vehicle should accelerate, haptic guidance application 132 could determine the location and orientation of the driver's feet via sensor data from one or more sensors 320 located in the foot well. Then, if haptic guidance application 132 determines that the driver's foot is located over the accelerator, haptic guidance application 132 could determine one or more characteristics of a haptic sensation to generate on the driver's foot in order to indicate to the driver that he or she should depress the accelerator. If, on the other hand, haptic guidance application 132 determines that the foot is located over the brake, then haptic guidance application 132 could determine one or more characteristics of a haptic sensation to generate on the driver's foot to indicate to the driver that he or she should lift his or her foot from the brake pedal and move the foot onto the accelerator. For example, haptic guidance application 132 could generate a haptic sensation on the driver's foot via haptic output devices 330, where the haptic sensation moves from the left side of the foot to the right side of the foot in order to indicate to the driver that he or she should move his foot from the brake pedal to the accelerator. Next, haptic guidance application 132 could transmit control signals to haptic output devices 330 in order to generate a second haptic sensation on the driver's foot which indicates to the driver that he or she should depress the accelerator.

In addition, haptic guidance application 132 may generate a haptic sensation on the driver in order to alert the driver about a vehicle event, road condition, etc. For example, when the driver is in a semi-autonomous driving environment and the driver's seat is facing to the rear of the vehicle, haptic guidance application 132 may provide an alert to the driver in the form of a haptic sensation when he or she should turn his or her seat around and/or take control of a particular vehicle device. In addition, haptic guidance application 132 may generate a sequence of haptic sensations in order to guide the driver in turning his or her seat to face the front of the vehicle in order to facilitate him or her in modifying the vehicle device.

Moreover, in semi-autonomous vehicles, haptic guidance application 132 may receive control signals from one or more control devices and generate haptic sensations on the driver in order to alert the driver that modifying one or more parameters is unsafe. For example, if the driver attempts to shift the transmission to a gear which is unsafe at the present speed of the vehicle, then haptic guidance application 132 may receive a control signal to generate a haptic sensation on the driver. Haptic guidance application 132 could then generate a haptic sensation which has a high intensity on the driver's hand. By implementing a haptic sensation with a high intensity, haptic guidance application 132 could alert and/or deter the driver from shifting the transmission to an unsafe gear.

In addition, if a vehicle has a driver monitoring system, haptic guidance application 132 may implement various notifications from the driver monitoring system via haptic sensation on the driver. For example, haptic guidance application 132 could receive control signals from the driver monitoring system which indicate that the driver should modify one or more parameters by changing the position of one or more vehicle devices. Haptic guidance application 132 could then generate haptic sensations on the driver in order to indicate to the driver how he or she should vary the position of the vehicle device(s) in order to modify the parameter(s).

Figure 4A:
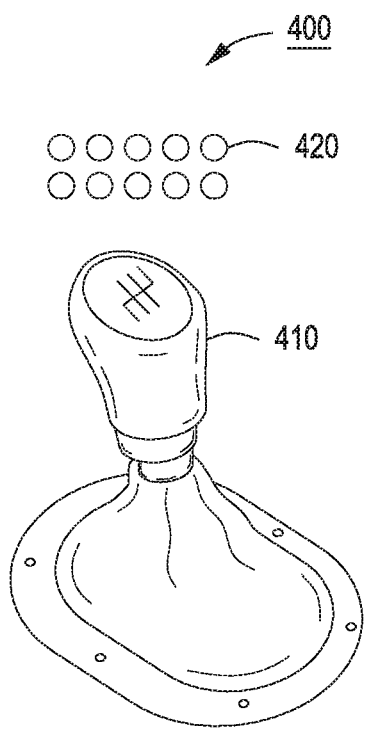
FIGS. 4A-4C illustrate different arrangements of haptic output devices for generating haptic sensations, according to various embodiments.
Figure 4B:
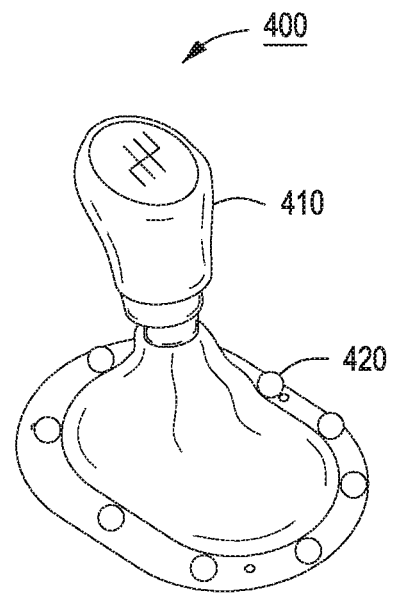
Figure 4C:
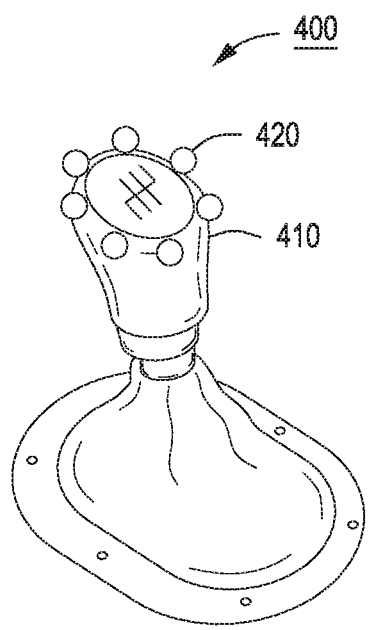

FIGS. 4A-4C illustrate different arrangements of haptic output devices for generating haptic sensations, according to various embodiments. As shown, system environment 400 contains vehicle device 410 and haptic output devices 420.

As noted herein, haptic output devices 420 may include ultrasonic transducers, air output devices, and/or other types of haptic output devices. In various embodiments, haptic guidance application 132 may determine one or more characteristics of the haptic sensation generated on the driver's hand, including the intensity, location, shape, frequency, movement, and size of the haptic sensation.

In such embodiments, haptic guidance application 132 may generate a haptic sensation with a particular set of characteristics, by causing the haptic output of two or more haptic output devices 420 to constructively and/or destructively interfere. For example, haptic output generated by two or more haptic output devices 420 may occupy a particular location in space at a particular time, enabling the haptic output of each haptic output device to interfere constructively and/or destructively with the haptic output of one or more other haptic output devices. Constructive and/or destructive interference between haptic output generated by different haptic output devices may then produce a haptic sensation at the location at which the haptic output constructively interferes. Accordingly, in various embodiments, haptic guidance application 132 may cause the haptic output from a haptic output device to interfere with the haptic output of one or more other haptic output devices in order to generate a haptic sensation at a particular location.

Further, in various embodiments, haptic guidance application 132 may modify the intensity and/or phase of the haptic output generated by each haptic output device in order to further control the intensity pattern generated by the haptic outputs. Using such techniques, haptic guidance application 132 may shift the location of intensity peaks, may increase or decrease the number of intensity peaks, and/or may adjust the shape and/or magnitude of one or more intensity peaks. As a result, haptic guidance application 132 may localize and/or modify various characteristics of the haptic sensation generated on the user. For example, haptic guidance application 132 could use such techniques to alter the intensity, size, location, and/or shape of the haptic sensation generated on the user's hand.

In addition, air output devices (e.g., air vortex generators) may be used to generate haptic sensations on a driver's hand. In various embodiments, haptic guidance application 132 may use haptic output devices 420 that include air output devices to implement any of the techniques described herein. For example, air output devices located proximate to vehicle device 410 could generate haptic sensations on a driver's hand, palm, forearm, etc. in order to indicate to the driver that he or she should modify the position of vehicle device 410. In addition, each air output device may emit air vortices into multiple areas, such as by implementing pan-tilt actuation which enables air vortex generators to emit air vortices in different directions. In such embodiments, haptic guidance application 132 may generate haptic sensations with complex characteristics on various parts of the user.

As shown in FIG. 4A, haptic output devices 420 may be arranged in an array proximate to vehicle device 410. For example, haptic output devices 420 could be arranged in a 5-by-2 array. In various embodiments, arrays of other dimensions and/or shapes may be implemented. For example, ultrasonic transducer arrays could be arranged in 4-by-4 arrays, 8-by-8 arrays, 16-by-16 arrays, etc. Further, although haptic output devices 420 are illustrated as being in a specific position relative to vehicle device 410, in other embodiments, haptic output devices 420 may be positioned at any location proximate to vehicle device 410.

In FIG. 4B, haptic output devices 420 are arranged around the circumference of vehicle device 410. Although the embodiment shown in FIG. 4B implements an elliptical configuration of haptic output devices 420, any other shape (e.g., circular, rectangular, polygonal, freeform, etc.) may be implemented in various embodiments. In such embodiments, a haptic sensation may be generated on the driver's palm and/or forearm. In addition, haptic sensations may be generated on the driver's fingers and/or finger tips.

In FIG. 4C, haptic output devices 420 are arranged on vehicle device 410. In such embodiments, haptic sensations could be generated on the driver's palm, fingers, and/or forearm. Additionally or alternatively, haptic output devices could be arranged sporadically around vehicle device 410. In some embodiments, haptic output devices 420 may be located in various areas of a vehicle with usable space (e.g., on surfaces of the vehicle with no vehicle devices, objects, or other obstructions, such as displays). Then, given a particular arrangement of haptic output devices 420 proximate to vehicle device 410, haptic guidance application 132 may control the haptic output of each of haptic output devices 420 in order to generate a haptic sensation on the driver's hand.

Although various embodiments disclosed herein are described with respect to specific types of vehicle devices, any of the techniques disclosed herein may be performed with respect to any type of vehicle device. Further, although various embodiments are described in conjunction with specific arrangements of haptic output devices, any of the arrangements of haptic output devices disclosed herein, such as those described above with respect to FIGS. 4A-4C, may be implemented in any technique to generate haptic output proximate to any type of vehicle device. In addition, any arrangement of haptic output devices 420 may be implemented to generate haptic sensations having any shape, including, without limitation, haptic sensations having elliptical, rectangular, polygonal, and freeform shapes.

Figure 5:
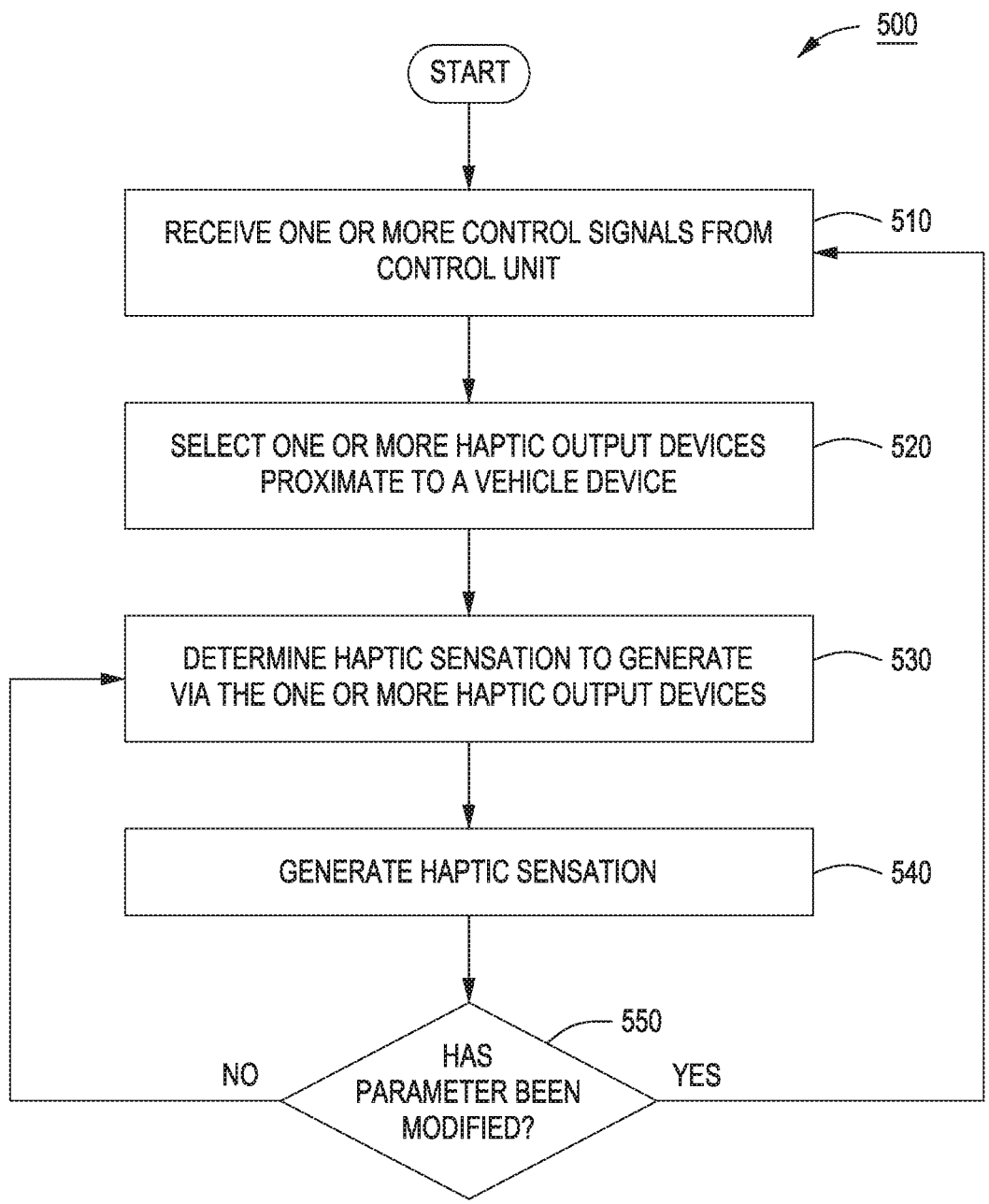
FIG. 5 illustrates a flow diagram of method steps for directing a user to modify an aspect of a vehicle via haptic output, according to various embodiments.

FIG. 5 illustrates a flow diagram of method steps for directing a user to modify an aspect of a vehicle via haptic output, according to various embodiments. Although the method steps are described in conjunction with the system of FIGS. 1-3 and 4A-4C, persons skilled in the art will understand that any system configured to perform the method steps, in any order, falls within the scope of the present invention.

As shown in FIG. 5, a method 500 begins at step 510, where haptic guidance application 132 receives one or more control signals from a control unit. In some embodiments, at step 510, haptic guidance application 132 may also determine a parameter that should be modified and a vehicle device that is associated with the parameter. Then, at step 520, haptic guidance application 132 selects one or more haptic output devices located proximate to the vehicle device. Then, at step 530, haptic guidance application 132 determines a haptic sensation to generate via the one or more haptic output devices.

Next, at step 540, haptic guidance application 132 generates a haptic sensation on the user. Finally, at step 550, haptic guidance application 132 determines whether the parameter has been modified (e.g., by the user). For example, at step 550, haptic guidance application 132 could be notified by a control unit that the parameter has changed. Alternatively or additionally, haptic guidance application 132 may determine that the parameter has been modified by analyzing sensor data which indicates that the position of the vehicle device has changed.

If, at step 550, haptic guidance application 132 determines that the parameter has changed, then method 500 returns to step 510, where haptic guidance application 132 receives one or more control signals from a control unit. If the parameter has not changed, then method 500 returns to step 530, where haptic guidance application 132 may again determine a haptic sensation to generate on the driver via one or more haptic output devices.

In some embodiments, haptic guidance application 132 may determine that the position and/or orientation of the user (e.g., the user's hand) has changed. In such embodiments, if the parameter has not changed, then method 500 returns to step 520, where haptic guidance application 132 selects one or more haptic output devices proximate to a vehicle device. Haptic guidance application 132 selects haptic output devices proximate to the vehicle device which can direct haptic output to the new location and/or orientation of the user's hand. Although various embodiments are described as generating haptic sensations on a hand of a user, in any of the embodiments described above, haptic sensations may be generated on any part of a user's body. In various embodiments, the haptic output devices generate haptic sensations on the user without making any type of direct, physical contact with the user.

In various embodiments, at step 510, haptic guidance application 132 may determine the position of the user via sensor data from one or more sensors. Haptic guidance application 132 may further receive the size and orientation of the driver's hand, in addition to the position and orientation of the hand relative to the vehicle device. Further, in some embodiments, at step 520, haptic guidance application 132 may determine which haptic output devices are proximate to the vehicle device and may select one or more haptic output devices to generate a haptic sensation on the user. Then, at step 530, haptic guidance application 132 could determine one or more characteristics of the haptic sensation to generate on the user. For example, haptic guidance application 132 could determine the size, shape, location, and intensity of the haptic sensation. In addition, haptic guidance application 132 could determine the direction, frequency and movement that the haptic sensation should have on the user's hand. Haptic guidance application 132 may determine one or more characteristics of the haptic sensation based on the type, position, and/or orientation of the haptic output devices which are proximate to the vehicle device and the position and orientation of the vehicle device and the user.

In sum, the haptic guidance application receives a control signal from a control unit. The haptic guidance application may then determine a parameter that should be modified and a vehicle device that is associated with the parameter. The haptic guidance application may then select one or more haptic output devices proximate to the vehicle device and also determine a haptic sensation to generate on the user. The haptic guidance application then transmits a control signal to the haptic output device(s), which generate a haptic sensation on the user.

At least one advantage of the techniques described herein is that a user can be notified that a parameter should be modified without requiring the user to divert his or her attention to a visual and/or auditory notification. Accordingly, a user is able to determine the parameter(s) which should be modified without the user having to expend additional cognitive resources to analyze a visual and/or auditory notification. Further, haptic sensations can be implemented as an alternative means for communicating various types of information to the user without overwhelming the user's visual and auditory senses. As a result, the techniques described herein may reduce the cognitive workload placed on a user when various types of information are provided to the user.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A system for directing a user to modify an aspect of a vehicle via haptic output, the system comprising:
   one or more haptic output devices configured to generate haptic output in response to a control signal; and
   a processor coupled to the one or more haptic output devices and configured to:
     determine, based on a second control signal received from a vehicle control unit, that a parameter associated with a vehicle device should be modified; and
     in response to the determining, transmit the control signal to the one or more haptic output devices.

2. The system of claim 1, wherein the haptic output indicates at least one of a direction in which the vehicle device should be moved and a distance by which the vehicle device should be moved.

3. The system of claim 1, wherein the second control signal comprises a target value of the parameter.

4. The system of claim 3, wherein the processor is further configured to:
   determine, based on a current value of the parameter and the target value of the parameter, at least one of a direction and a location of the haptic output generated by the one or more haptic output devices; and
   generate the control signal based on the at least one of the direction and the location.

5. The system of claim 3, wherein the processor is further configured to select, based on a current value of the parameter and the target value of the parameter, the one or more haptic output devices from a plurality of haptic output devices.

6. The system of claim 1, further comprising one or more sensors coupled to the processor and configured to acquire sensor data, wherein the processor is further configured to analyze the sensor data to determine a location of a user.

7. The system of claim 6, wherein the processor is further configured to determine, based on the location of the user, at least one of a direction and a location of the haptic output generated by the one or more haptic output devices.

8. The system of claim 6, wherein the processor is further configured to select, based on the location of the user, the one or more haptic output devices from a plurality of haptic output devices.

9. The system of claim 1, wherein the one or more haptic output devices comprise at least one of an ultrasound transducer and an air output device.

10. The system of claim 1, wherein the haptic output comprises a ridge, and the one or more haptic output devices are configured to change a location of the ridge as a function of time to indicate a direction in which the vehicle device should be moved.

11. The system of claim 1, wherein generating the haptic output comprises generating first haptic output via a first haptic output device included in the one or more haptic output devices, and generating second haptic output via a second haptic output device included in the one or more haptic output devices, wherein the first haptic output constructively interferes with the second haptic output proximate to the vehicle device.

12. The system of claim 1, wherein the vehicle device comprises at least one of a gearshift device, a steering device, an accelerator device, a braking device, and a clutch device.

13. A method for directing a user to modify an aspect of a vehicle via haptic output, the method comprising:
- determining, based on a first control signal received from a vehicle control unit, that a parameter associated with a vehicle device should be modified; and
- in response to the determining, transmitting one or more second control signals to one or more haptic output devices that are proximate to the vehicle device, wherein the one or more haptic output devices generate haptic output based on the one or more second control signals.

14. The method of claim 13, wherein the vehicle device comprises at least one of a gearshift device, a steering device, an accelerator device, a braking device, and a clutch device.

15. The method of claim 13, wherein the first control signal comprises a target value of the parameter.

16. The method of claim 15, further comprising selecting, based on the target value of the parameter, the one or more haptic output devices from a plurality of haptic output devices.

17. The method of claim 13, further comprising:
- receiving sensor data from one or more sensors, wherein the sensor data is indicative of a location of a user; and
- determining, based on the location of the user, at least one of a direction and a location of the haptic output generated by the one or more haptic output devices.

18. A non-transitory computer-readable storage medium including instructions that, when executed by a processor, configure the processor to direct a user to modify an aspect of a vehicle via haptic output, by performing the steps of:
- receiving, from a vehicle control unit, an indication that a parameter associated with a vehicle device should be modified; and
- in response to the indication, transmitting one or more controls signals to one or more haptic output devices that are proximate to the vehicle device, wherein the one or more haptic output devices generate haptic output based on the one or more control signals.

* * * * *